United States Patent [19]
Kurihara

[11] Patent Number: 5,500,939
[45] Date of Patent: Mar. 19, 1996

[54] GRAPHIC DATA PARALLEL PROCESSING AND DISPLAYING APPARATUS WITH INCREASED DATA STORAGE EFFICIENCY

[75] Inventor: Katsuhide Kurihara, Kawasaki, Japan

[73] Assignee: Fujitsu Limited, Kawasaki, Japan

[21] Appl. No.: 274,725

[22] Filed: Jul. 18, 1994

[30] Foreign Application Priority Data

Oct. 7, 1993 [JP] Japan ................................. 5-251805

[51] Int. Cl.$^6$ .................................................. G06F 15/16
[52] U.S. Cl. .................................... 395/163; 395/164
[58] Field of Search .................................. 395/162–166, 395/400, 425, 853, 854; 345/26, 27, 133, 196, 203; 364/229.2, 931.41

[56] References Cited

U.S. PATENT DOCUMENTS 4,706,127  11/1987  Nobuta ................................. 358/449

Primary Examiner—Mark R. Powell
Assistant Examiner—Kee M. Tung
Attorney, Agent, or Firm—Staas & Halsey

[57] ABSTRACT

A graphic data parallel processing and displaying apparatus employs a plurality of graphic processors having a respectively associated plurality of FIFO memories and operates with a reduced waiting period relative to the FIFO memories being available to receive data from a main memory. Each FIFO memory has a set of at least first and second data quantity detectors which detect and set respective first and second flags indicating the existence of data at first and second corresponding data level locations therein and reset the state of the flag in the absence of data at those locations. A graphic data controller detects the type of data to be transferred and selects the corresponding ones of the flags and the states thereof, for determining the availability of sufficient space for receiving a transfer of data of the detected type, to be written into the FIFO memories.

10 Claims, 5 Drawing Sheets

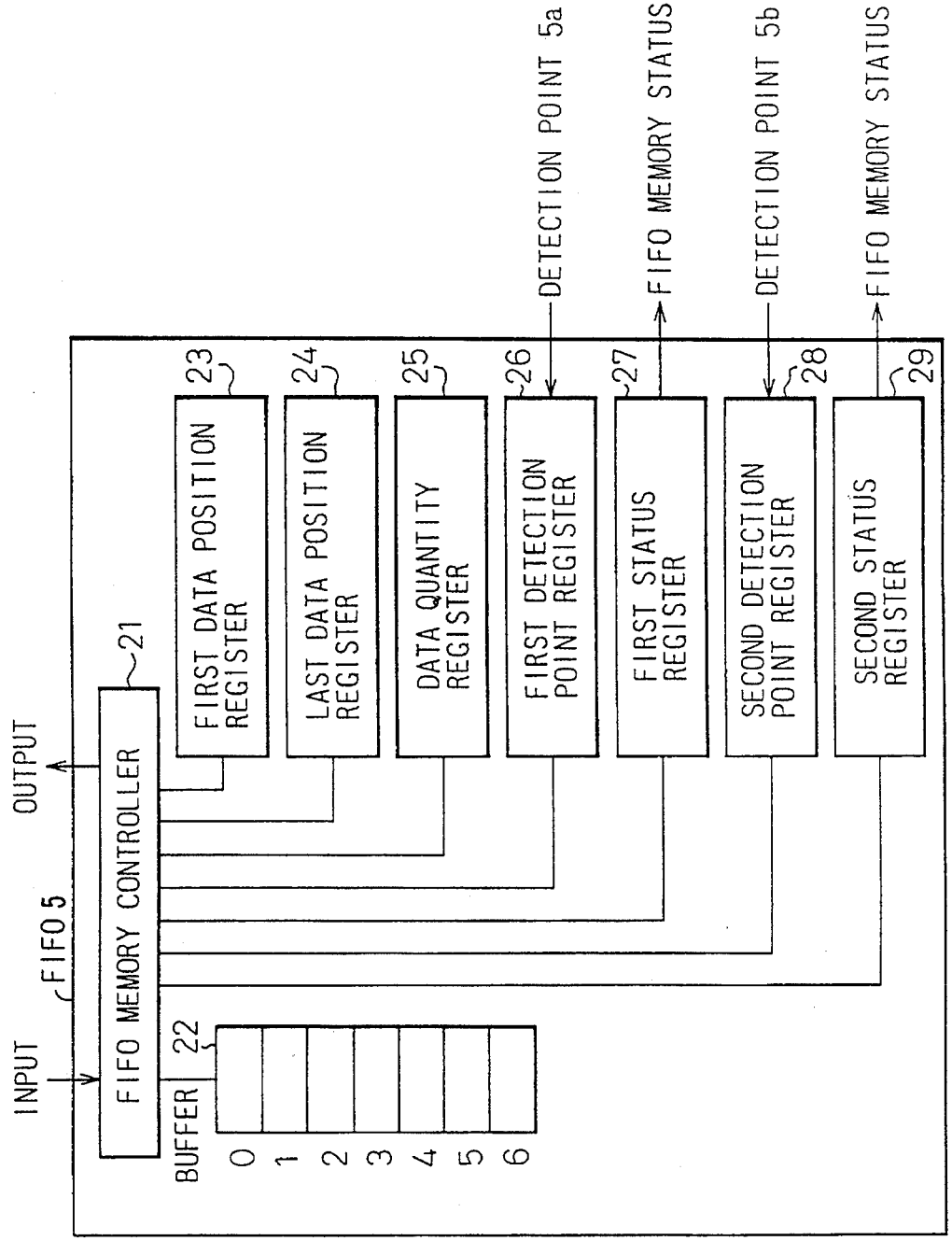

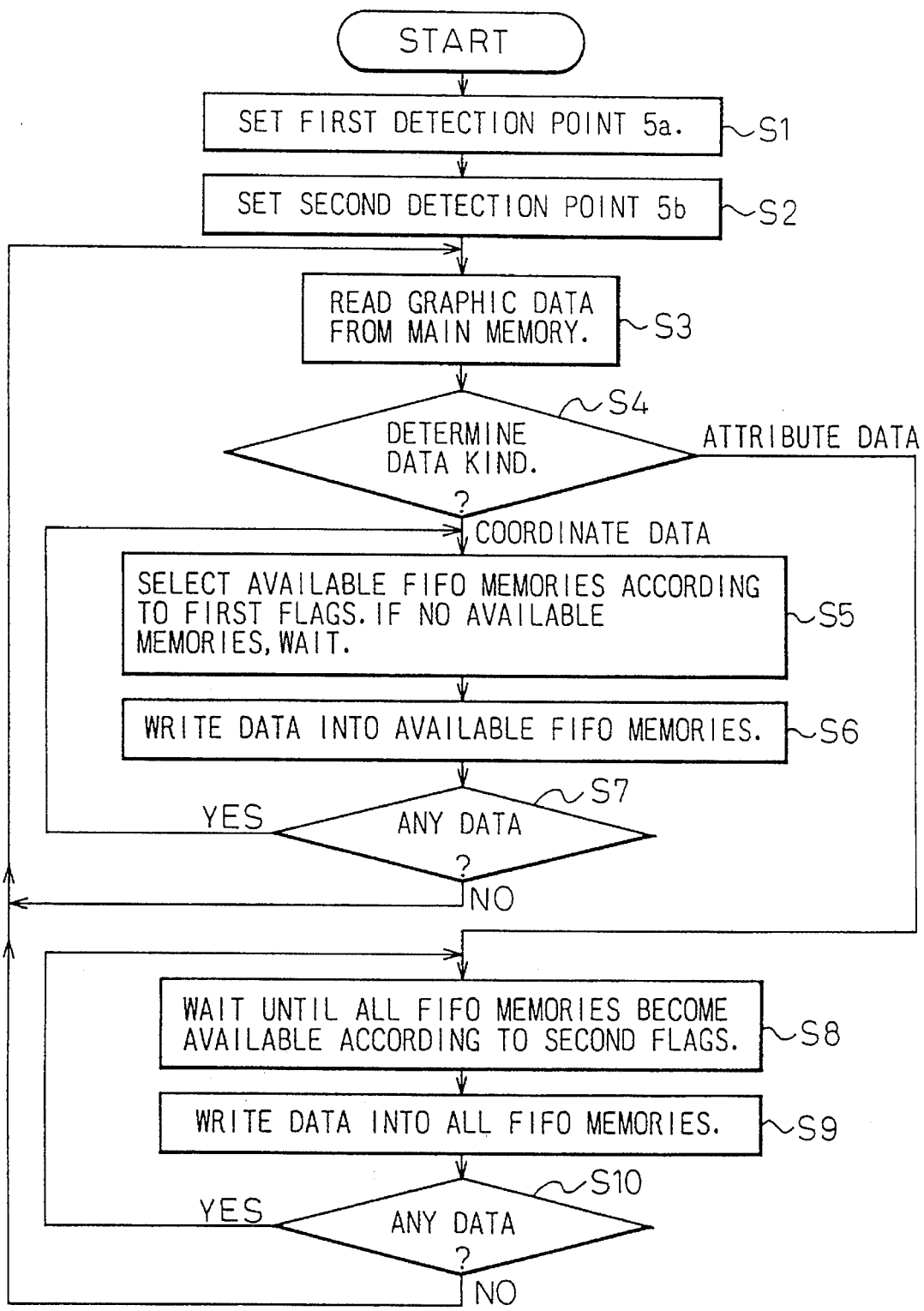

GRAPHIC DATA PARALLEL PROCESSING AND DISPLAYING APPARATUS WITH INCREASED DATA STORAGE EFFICIENCY

BACKGROUND OF THE INVENTION

1. Field of the Invention

The present invention relates to an apparatus employing a plurality of graphic processors for simultaneously processing graphic data and displaying a graphic image.

The fields of computer graphics, CAD and CAM, employ a graphic display apparatus that displays a large quantity of graphic data on a screen and changes the graphic data in real time. There is a technique of distributing graphic data from a main memory to the individual memories of graphic processors that simultaneously process the graphic data. The processing speed of each of the graphic processors depends on the type and size of the graphic data to process. Accordingly, since some of the graphic processors may have no data to process while the others still have data, it is required to efficiently drive the graphic processors to simultaneously process graphic data.

2. Description of the Related Art

FIGS. 4(A) and 4(B) show a graphic data parallel processing and displaying apparatus according to the prior art, and FIG. 5 is a flowchart showing the operations of the apparatus.

The apparatus of FIG. 4(A) is employed in the fields of computer graphics, CAD and CAM. This apparatus changes, corrects, and displays a large quantity of graphic data in real time. The apparatus also carries out shading on the graphic data, to provide a graphic image having reality with light and shade. This apparatus involves a great number of calculations.

The apparatus of FIG. 4(A) employs a plurality of graphic processors and distributes graphic data to them, which then simultaneously process the data.

In FIG. 4(A), the apparatus includes a graphic data controller 100, a main memory 101 for storing graphic data, a bus 102, half-full flags 103, FIFO (first-in first-out) memories 104a to 104d having the same structure, graphic processors 105a to 105d for simultaneously processing distributed graphic data, and a display 106 for receiving processed data from the processing units 105a to 105d and displaying a graphic image.

The half-full flags 103 correspond to the FIFO memories 104a to 104d, respectively. If any of the FIFO memories 104a to 104d is holding an amount of data larger than a predetermined quantity, for example, half of the full capacity, the corresponding flag is set to 1 (one), and if not, the flag is reset to 0 (zero).

To control the flags 103, each of the FIFO memories 104a to 104d has an arrangement as shown in FIG. 4(B) that sets or resets the corresponding flag depending on whether or not the quantity of data remaining in the FIFO memory is at a half-full point.

The operations of the prior art of FIGS. 4(A) and 4(B) will be explained with reference to the flowchart of FIG. 5.

Step S1 sets a half-full point in each of the FIFO memories. Step S2 reads graphic data from the main memory 101. Step S3 determines the type of the graphic data. The graphic data are coordinate data or attribute data. The coordinate data indicate the shape of a figure and are independently processed by the graphic processor 105a to 105d. The attribute data indicate, for example, the color of the figure and must be simultaneously processed by the graphic processors 105a to 105d.

If the step S3 determines that the graphic data are the coordinate data, step S4 selects each of the FIFO memories 104a to 104d having the zero half-full flags. If there are no FIFO memories having the zero half-full flag, the step S4 waits until any one of the half-full flags becomes 0. During this waiting period, the graphic processors 105a to 105d process coordinate data stored in the respective FIFO memories 104a to 104d. The quantities of the data in the FIFO memories decrease accordingly. If any one of the half-full flags becomes 0, step S5 transfers the coordinate data from the main memory 101 to the FIFO memory corresponding to the zero flag. The quantity of the transferred data is equal to the capacity of the FIFO memory minus a capacity corresponding to the half-full point. Step S6 determines if there are still coordinate data to be transferred to the FIFO memories. If there are, the flow returns to the step S4, and if not, the flow returns to the step S2 to read the next graphic data from the main memory 101.

If the data read in the step S2 are the attribute data, step S7 refers to the half-full flags and waits until every flag becomes 0. Since it usually takes a long time to process the attribute data, it is preferable to process them collectively. This is the reason for waiting until every half-full flag becomes 0.

After all of the half-full flags become 0, step S8 writes the attribute data into all FIFO memories. At this time, the quantity of the attribute data to be written is set so as not to exceed the amount of free space in each FIFO memory. Step S9 determines if there are still attribute data to be written into the FIFO memories. If there are, the flow returns to the step S7, and if not, the flow returns to the step S2 to read the next graphic data from the main memory 101.

The reason why the prior art employs the half-full flags will be explained with reference to FIG. 4(B).

If a point A, close to a full point, in the FIFO memory is employed to set and reset the corresponding flag, the quantity of data to be written into the FIFO memory is always small when the flag indicates that there are no data at the point A. Namely, the amount of free space corresponding to the point A is small. On the other hand, if a point B, close to an empty point, in the FIFO memory is employed to set and reset the flag, it takes a long time until the flag becomes 0. Accordingly, the half-full point, i.e., an average point, is more efficient than the point A or B in setting and resetting the flag.

In this way, the graphic processors 105a to 105d independently process graphic data if they are coordinate data. It is possible to transfer the coordinate data to any of the FIFO memories if the corresponding half-full flag is 0. If the graphic data are attribute data, however, they are transferrable to the FIFO memories only when all of the half-full flags are 0. Namely, the attribute data involve a long waiting time and cause efficiency to deteriorate.

The prior art causes fluctuations in the processing speed of the graphic processors depending on the type and size of graphic data. This may cause no problem when the graphic data are coordinate data that are separately transferable to the graphic processors through the FIFO memories. If the data are attribute data that must be simultaneously transferred to the graphic processors through the FIFO memories, it is necessary to wait until the half-full flags of all of the FIFO memories are reset to 0. Namely, it must wait until the slowest graphic processor is released from a half-full state. Until this occasion, the other graphic processors will have no data to process, causing a waste of time. This will deteriorate the performance of the apparatus.

SUMMARY OF THE INVENTION

An object of the present invention is to provide a graphic data parallel processing and displaying apparatus that efficiently drives graphic processors by reducing a period of waiting for all FIFO memories to have sufficient space to simultaneously process and display graphic data.

In order to accomplish the object, the present invention provides a graphic data parallel processing and displaying apparatus having a plurality of graphic processors for simultaneously processing graphic data and displaying a graphic image on a display. The graphic processors each have FIFO memories to receive graphic data.

The apparatus has data quantity detectors for detecting the quantity of data remaining in each of the FIFO memories at two different locations, or levels, in each FIFO memory.

The apparatus has a controller for determining the type of graphic data to be written into the FIFO memories, selecting one of the data quantity detectors according to the type of the graphic data, selecting available ones of the FIFO memories according to the output states of the selected detector, and writing the graphic data into the selected FIFO memories.

To solve the problem of a long wait time of the prior art in writing attribute data, the apparatus of the present invention employs at least two data quantity detectors to detect a data quantity in each FIFO memory at two locations in the FIFO memory. The apparatus detects the type of graphic data to be transferred to the FIFO memories, selects one of the detectors according to the type of the graphic data, and selects ones of the FIFO memories having sufficient space to receive the data according to outputs of the selected detector.

Since the present invention determines whether or not the FIFO memories have sufficient space to receive graphic data according to the type of the graphic data, the present invention greatly reduces the waiting time for writing the graphic data into the FIFO memories, compared with the prior art.

BRIEF DESCRIPTION OF THE DRAWINGS

FIGS. 1(A) and 1(B) illustrate a basic arrangement of the present invention, in which FIG. 1(A) is a general view showing a graphic data parallel processing and displaying apparatus according to the present invention and FIG. 1(B) shows detection points in a FIFO memory, at each of which a respective data quantity detector detects a corresponding data quantity in the FIFO memory;

FIG. 2 shows a FIFO memory according to an embodiment of the present invention;

FIG. 3 is a flowchart showing operations according to the embodiment;

FIGS. 4(A) and 4(B) show a basic arrangement of the prior art, in which FIG. 4(A) is a general view showing a graphic data parallel processing and displaying apparatus according to the prior art and FIG. 4(B) shows a detection point in a FIFO memory at which a data quantity detector detects a data quantity in the FIFO memory.

DESCRIPTION OF THE PREFERRED EMBODIMENTS

A graphic data parallel processing and displaying apparatus according to an embodiment of the present invention will be explained next in detail with reference to the drawings.

Figure 1A:
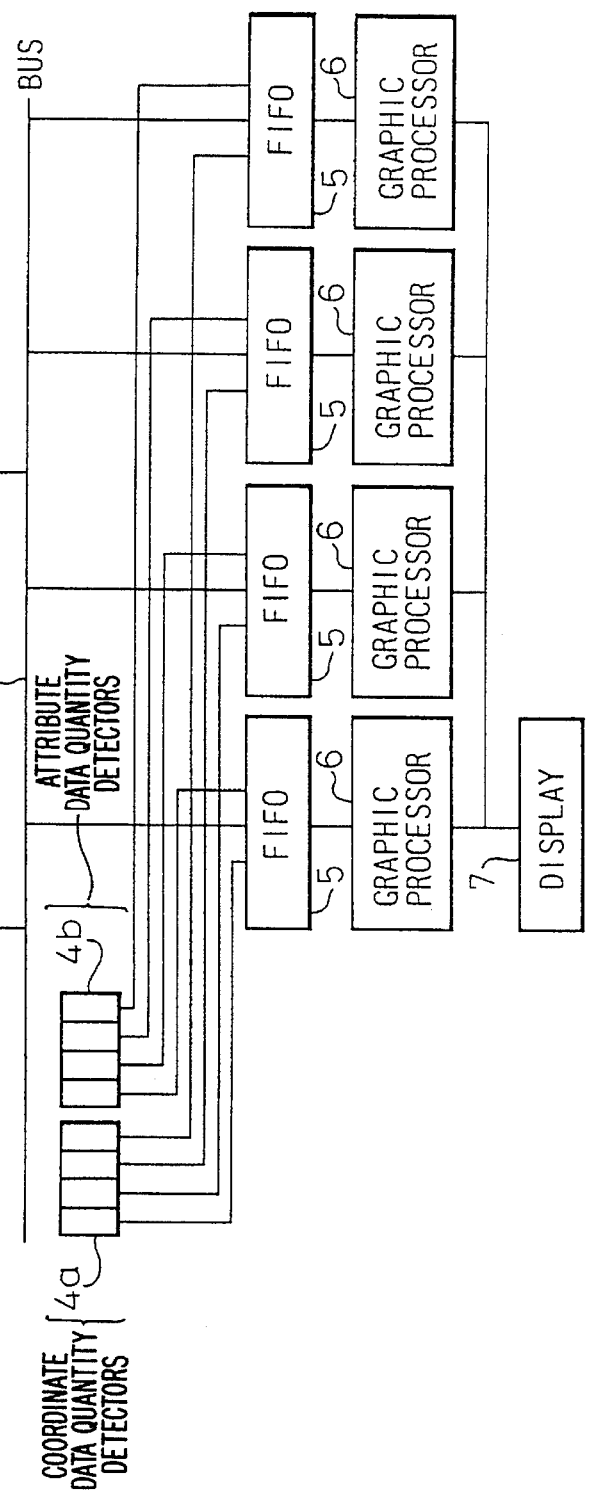

FIG. 1(A) is a block diagram showing the apparatus. The apparatus has a plurality of graphic processors 6 that simultaneously process graphic data and display a graphic image on a display 7.

The graphic processors 6 are each provided with FIFO memories 5 to receive graphic data. Data quantity detectors 4a and 4b detect the quantity of data remaining in the corresponding FIFO memories 5 and, more specifically, the quantities corresponding to respective, different locations, or levels, 5a and 5b in each FIFO memory 5.

A graphic data controller 1 determines the type of graphic data which has been transferred from a main memory 2 to the FIFO memories 5. According to the type of the graphic data, the controller 1 selects the corresponding ones of the detectors 4a and 4b and the available ones of the FIFO memories 5 according to the output states of the selected ones of the detectors 4a and 4b, and transfers the graphic data to the thus-selected FIFO memories 5 according to the type of the graphic data.

Figure 1B:
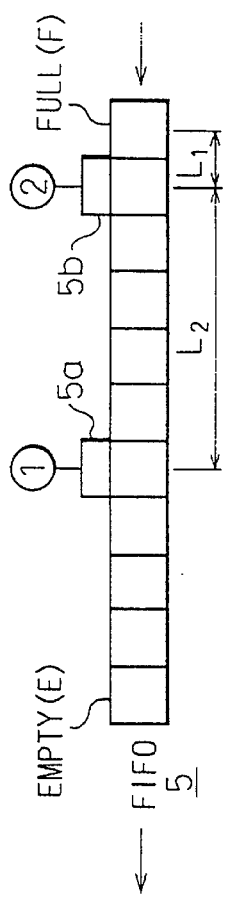
Figure 4A:
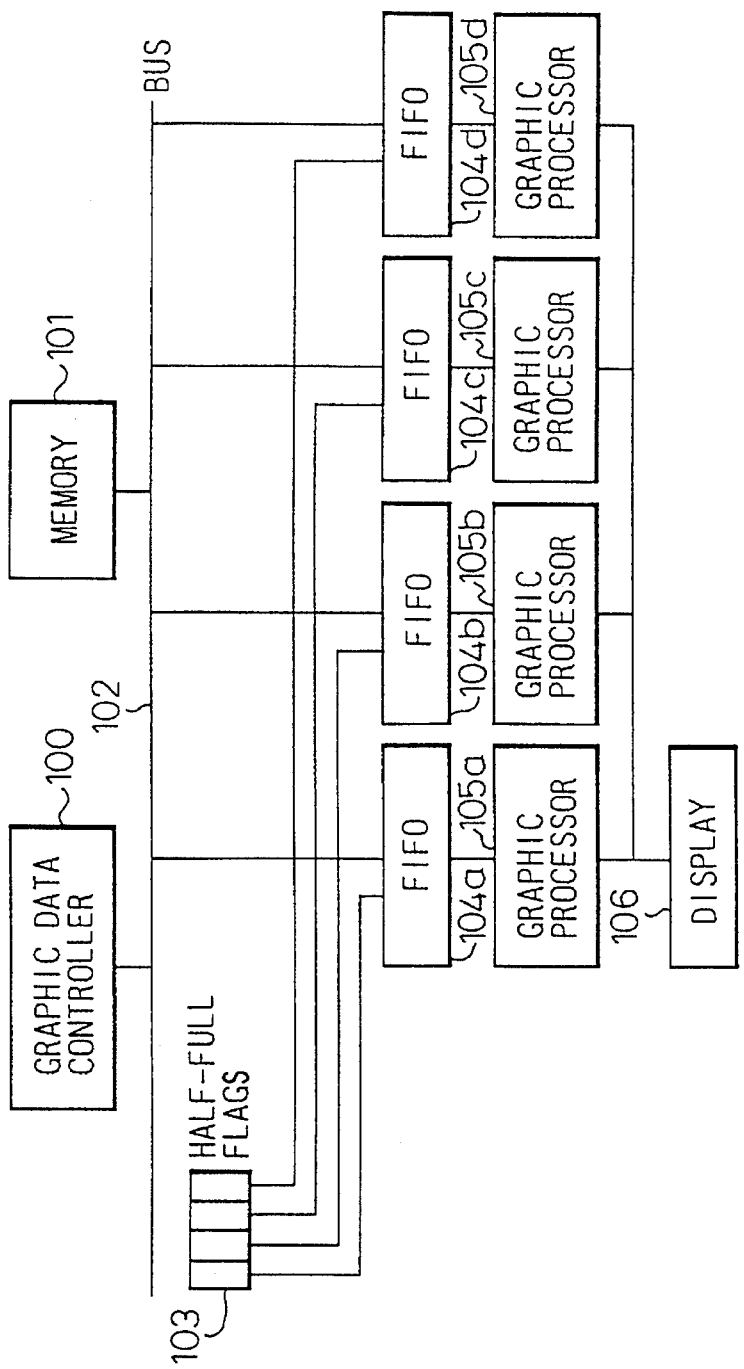
Figure 4B:
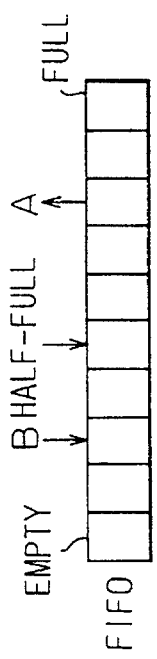
Figure 5:
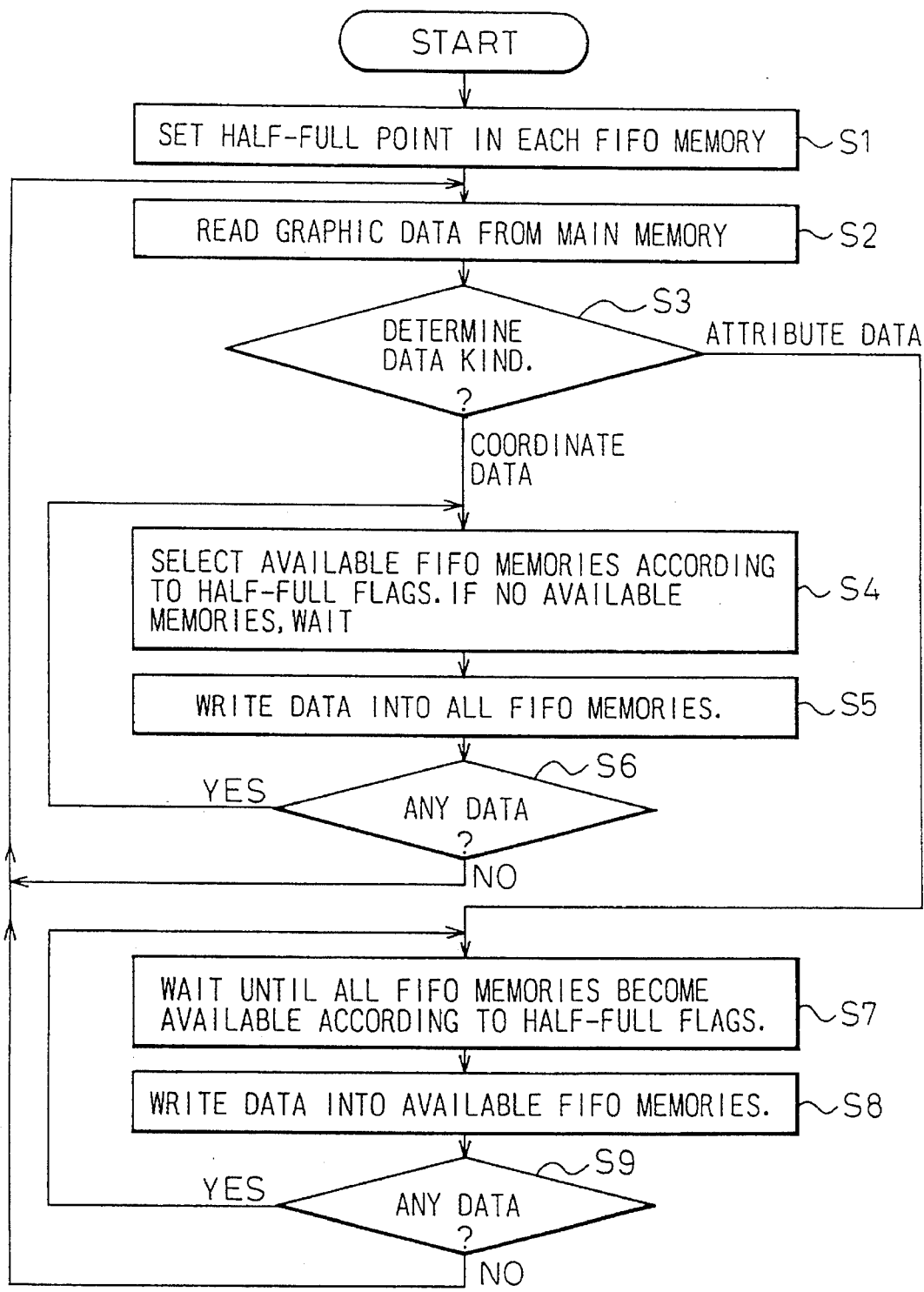
FIG. 5 is a flowchart showing operations according to the prior art.

With reference to both FIGS. 1(A) and 1(B), the apparatus includes the controller 1, the main memory 2, a bus 3, first data quantity detectors 4a for detecting the corresponding quantities of data remaining in the respective FIFO memories 5, and more particularly at a first detection point 5a in each FIFO memory 5, and for providing a first data quantity detection flag representing the data storing state of the corresponding FIFO memory, and second data quantity detectors 4b for detecting the corresponding quantities of data remaining in the respective FIFO memories 5, and more particularly at a second detection point 5b in each FIFO memory 5, and for providing a second data quantity detection flag representing the data storing state of the corresponding FIFO memory. The first and second detection points 5a and 5b are located at different respective positions, or levels, in each FIFO memory 5. The FIFO memories 5 individually store graphic data to be processed in parallel by the respective graphic processors 6. Each of the FIFO memories 5 is connected to corresponding first and second data quantity detectors 4a and 4b. The apparatus has the display 7.

Each first data quantity detector 4a provides a first data quantity detection flag according to a data quantity detection result at the first detection point 5a in the corresponding FIFO memory 5, and each second data quantity detector 4b provides a second data quantity detection flag according to a data quantity detection result at the second detection point 5b in the corresponding FIFO memory 5. The number of data quantity detection points for each FIFO memory 5 may be more than two.

The reason why the present invention sets the two detection points 5a and 5b to detect the data quantities in each of the FIFO memories 5 is because the attribute data require a long processing time but are small in quantity. With this arrangement, the system of the present invention is capable of simultaneously transferring the attribute data, with only a short wait time, to the FIFO memories 5 because the system does not wait until all of the FIFO memories 5 are emptied. Thereafter, the FIFO memories 5 simultaneously transfer the data to the respective graphic processors 6.

FIG. 1(B) is a model showing one of the FIFO memories 5. As explained above, attribute data require a long processing time but are small in quantity. Accordingly, the second detector 4b detects the quantity of data in the corresponding FIFO memory 5 at a second detection point 5b and provides the second flag. The second detection point 5b is close to a full point F while assuring a sufficient space for storing the transferred attribute data. The location, or level, of the second detection point 5b may be calculated, or determined, by subtracting the expected maximum quantity of the attribute data from the capacity of the FIFO memory. On the other hand, the first detector 4a detects the quantity of data in the FIFO memory at a first detection point 5a and provides the first flag. The first detection point 5a is positioned, for example, in the middle between an empty point E and the second detection point 5b. The detection points 5a and 5b may be positioned anywhere which satisfies the relationship of the first detection point 5a< the second detection point 5b with the empty point E serving as a reference point.

When graphic data read by the controller 1 out of the main memory 2 are coordinate data representing a shape, the first detectors 4a are selected, which provide the first flags from the first detection points 5a in the FIFO memories 5. The first detectors having 0 (zero) first flags are selected as indicating that the corresponding FIFO memories 5 have sufficient space to receive coordinate data. Then, the coordinate data are transferred to the selected FIFO memories 5.

When the graphic data read by the controller 1 out of the main memory 2 are attribute data, the second detectors 4b are selected and the second flags from the second detection points 5b in the FIFO memories 5 are checked to see whether or not the second flags are each 0, as indicating that all of the FIFO memories 5 are ready to receive data. If all flags are 0, the attribute data are simultaneously transferred to the FIFO memories 5. If any one of the second flags is 1, the attribute data will not be transferred and, instead, the system will wait until all of the second flags become 0.

The data quantity detectors according to the present invention thus are correlated to respective, different detection points which are commonly positioned in each of the FIFO memories.

The graphic processors 6 process graphic data in parallel and display a graphic image on the display 7. The number of the graphic processors 6 and the number of the FIFO memories 5 provided for the processors 6 are not particularly limited. In FIG. 1(A), there are four FIFO memories 5.

Among the graphic data, the coordinate data represent the shape of a figure and the attribute data represent the characteristics such as color, shade, and curves of the figure.

The present invention separately transfers the coordinate and attribute data. For example, the present invention transfers (1) attribute data representing red, (2) coordinate data representing a triangle, (3) attribute data representing blue, (4) coordinate data representing part of a square, and (5) coordinate data representing the remaining part of the square. In synchronization with the transmission of the graphic data, the present invention determines whether they are attribute data or coordinate data.

According to the type of graphic data, the present invention selects the related one of the detectors 4a and 4b and which then provides the corresponding one of the first or second flags from the first or second detection points 5a and 5b, respectively, to indicate whether or not the FIFO memories 5 have space to receive the attribute or coordinate data.

A standard data communication method limits the quantity of data in one transmission operation. Accordingly, the attribute and coordinate data are transmitted block by block, each having a proper size.

When one of the detectors specifies any FIFO memory to have a free space to receive data, the data to be written in the FIFO memory must fit the free space.

If the data to be transferred are the attribute data, the second detectors 5b are selected, which provide the second flags from the FIFO memories. If any one of the flags is 1, the corresponding FIFO memory has no space to receive the attribute data, and if it is 0, the corresponding FIFO memory has free space to receive the attribute data.

If the data to be transferred are the coordinate data, the first detectors 5a are selected, which provide the first flags from the FIFO memories. If any one of the flags is 1, the corresponding FIFO memory has no space to receive the coordinate data, and if it is 0, the corresponding FIFO memory has free space to receive the coordinate data.

In any one of the above cases, what is important is a relationship between the length of a block of data to be transmitted and the length of a free space in each of the FIFO memories 5 that is dependent on the type of data. The present invention secures free space of a required length in the FIFO memories according to the type of data.

Namely, the present invention predetermines the length of a block of coordinate data and the length of a block of attribute data transmittable in one transmission operation. At the same time, the present invention sets the length of free space to be prepared in the FIFO memories to be longer than the block length depending on the type of transmitted data.

As explained above, the FIFO memories 5 are connected to the first detector 4a for coordinate data and the second detector 4b for attribute data.

The first detector 4a corresponds to the first detection point 5a which is set at a position in the FIFO 5, indicated as (1) in FIG. 1(B), apart (i.e., spaced) from the data empty point E by a predetermined number of registers. The second detector 4b corresponds to the second detection point 5b which is set at a position in the FIFO 5, indicated as (2) in FIG. 1(B), apart (i.e., spaced) from the data empty point E by a predetermined number of registers.

A length between the second detection point 5b and the data full point F corresponds to the expected maximum length of a block of attribute data. The first detection point 5a is preferably in the middle between the second detection point 5b and the data empty point E.

The length of a transmittable block of coordinate data is preferably shorter than a length between the data empty point E and the first detection point 5a, i.e., a length between the first and second detection points 5a and 5b.

The first detectors 4a provide the first flags according to whether or not the corresponding FIFO memories 5 have data at the associated first detection points 5a. The second detectors 4b provide the second flags according to whether or not the corresponding FIFO memories 5 have data at the associated second detection points 5b.

The controller 1 determines whether or not graphic data must be transferred to selected ones of the FIFO memories according to the flags.

The controller 1 determines the type of graphic data to be transferred to the FIFO memories. If they are coordinate data, the controller 1 refers to the first flags provided by the first detectors 4a, to select those FIFO memories 5 having a sufficient free space therefor, and writes the coordinate data into the thus-selected FIFO memories 5. If the data are attribute data, the controller 1 refers to the second flags provided by the second detectors 4b, to determine whether or not all of the FIFO memories 5 are ready (i.e., have sufficient free space) to receive the data. If they are ready, the controller 1 writes the attribute data into the FIFO memories 5. If any one of the FIFO memories 5 has insufficient space to receive the attribute data, the controller suspends the write operation until every one of the FIFO memories 5 has sufficient free space to receive the attribute data.

FIG. 2 shows an example of one of the FIFO memories 5. The present invention is applicable to any type of FIFO memories.

The FIFO memory has a FIFO memory controller 21, a data buffer 22, a first data position register 23 for indicating the first position of data stored in the buffer 22, a last data position register 24 for indicating the last position of the data stored in the buffer 22, a data quantity register 25 indicating the number of data pieces stored in the buffer 22, a first detection point register 26 in which the first detection point 5a is set, a first status register 27 to be set to high if data are detected at the first detection point 5a, a second detection point register 28 in which the second detection point 5b is set, and a second status register 29 to be set to high if data are detected at the second detection point 5b.

The operations of the FIFO memory will be explained next.

The registers 23, 24, and 25 are initialized to 0. The first detection point 5a is set in the register 26, and the second detection point 5b is set in the register.

A graphic data write operation to the FIFO memories will now be explained.

The FIFO memory controller 21 stores a block of input data in the buffer 22 at a position indicated by the last data position register 24 and increments the register 24 and the data quantity register 25, each by one. If the data quantity stored in the data quantity register 25 is over (i.e., exceeds) the first detection point 5a stored in the register 26, the first status register 27 is set to high. If the data quantity in the register 25 is over (i.e., exceeds) the second detection point 5b in the register 28, the second status register 29 is set to high.

An operation of transferring graphic data from the FIFO memories to the respective graphic processors will be explained next.

The FIFO memory controller 21 sends data stored in the buffer 22 at a position indicated by the first data position register 23 to the corresponding graphic processor, increments the first data position register 23 by one, and decrements the data quantity register 25 by one. If the data quantity stored in the data quantity register 25 is below the first detection point 5a in the register 26, the first status register 27 is set to low to indicate that the FIFO memory has space to receive data. If the data quantity in the register 25 is below the second detection point 5b in the register 28, the second status register 29 is set to low to indicate that the FIFO memory has space to receive data.

An output of the first status register 27 of the FIFO memory 5 of FIG. 2 (representative of all the FIFO memories 5 in FIG. 1(A)) is connected to the corresponding first detector 4a (FIG. 1(A)). Similarly, an output of the second status register 29 of the FIFO memory of FIG. 2 (representative of all the FIFO memories 5 in FIG. 1(A)) is connected to the corresponding second detector 4b (FIG. 1(A)). The detectors 4a and 4b provide flags of 1 for the FIFO memories providing high outputs and flags of 0 for those providing low outputs.

FIG. 3 is a flowchart showing steps carried out by the graphic data controller 1 of FIGS. 1(A) and 1(B).

Step S1 sets the first detection point 5a for coordinate data in each of the FIFO memories. Step S2 sets the second detection point 5b for attribute data in each of the FIFO memories.

Step S3 reads graphic data from the main memory 2, and step S4 determines the type of data. If the data are coordinate data, step S5 refers to the first flags set by the first detector 4a and selects the FIFO memories 5 whose first flags are 0. If all of the first flags are 1, the step S5 waits until any one of the first flags becomes 0. Step S6 writes the data into the selected FIFO memories without causing an overflow in the FIFO memories. Step S7 determines whether or not there are coordinate data to be written, and if there are, the flow returns to the step S5.

If the step S4 determines that the data are attribute data, step S8 refers to the second flags set by the second detector 4b and determines whether or not all of the second flags are 0. If any one of the second flags is 1, the step S8 waits until all of the second flags become 0. If all of the second flags are 0, step S9 writes the attribute data into the FIFO memories. Step S10 determines whether or not there are attribute data to be written, and if there are, the flow returns to the step S8. If there are no data, the flow returns to the step S3.

As explained above, the graphic data parallel processing and displaying apparatus according to the present invention classifies graphic data into coordinate data and attribute data, detects the type of data to be transferred, determines whether the FIFO memories have a free space to receive the detected type (i.e., coordinate or attribute) of data, and transfers the data to the available FIFO memories, which send the data to the respective graphic processors.

For the coordinate data, the apparatus employs the first detectors 4a and selects those corresponding FIFO memories 5 having free space to receive such data according to the outputs of the first detectors 4a. If there are no FIFO memories having sufficient free space, the apparatus waits until any one of the FIFO memories has sufficient free space and then selects that FIFO memory and writes the coordinate data in the thus-selected FIFO memory.

Each first detector 4a checks the corresponding FIFO memory 5 at the first detection point 5a. If there are data at the first detection point 5a, it is determined that the FIFO memory in question has no space to receive coordinate data. The first detection point 5a is located at the position (1) in the middle of the space between the empty point E and the position (2) for the second detection point 5b, as shown in FIG. 1(B).

The location of the first detection point 5a is not limited to the position (1) of FIG. 1(B) but it may be optionally located around the position (1).

The maximum length of a block of coordinate data to be written is preferably L2, equal to a distance between positions (1) and (2) in FIG. 1(B).

According to the present invention, the size of each FIFO memory and the position of the first detection point 5a are determined according to the size of coordinate data used.

For attribute data, each second detector 4b checks the corresponding FIFO memory at the second detection point 5b in the FIFO memory. If there are data at the second detection point 5b, it is determined that the FIFO memory has no space to receive the attribute data. The second detection point 5b is located at the position (2) in FIG. 1(B). A length L1 between the full point F and the second detection point 5b is set to be substantially equal to the length of a block of attribute data to be written into the FIFO memory.

According to the present invention, the size of each FIFO memory and the position of the second detection point 5b are determined according to the size of attribute data used.

In this way, the present invention reduces a suspension period in which no attribute data are transferrable due to fluctuations in coordinate data (shape data) and improves processing speed.

The present invention separately processes coordinate data with the graphic processors, thereby minimizing fluctuations in processing periods in the graphic processors due to fluctuations in the quantities of the coordinate data and quickly and simultaneously transferring attribute data to all of the graphic processors.

I claim:

1. A graphic data parallel processing and displaying apparatus having a plurality of graphic processors for simultaneously processing graphic data and defining a corresponding graphic image and for displaying the corresponding graphic image on a display, the graphic data for each graphic image being of first and second, different types and of relatively and respectively larger and smaller quantities and requiring relatively and respectively smaller and greater processing times, comprising:

a plurality of FIFO memories respectively associated with the plurality of graphic processors and receiving distributed graphic data for supply to, and for processing by, the respectively associated plurality of graphic processors;

a plurality of sets of data quantity detectors respectively associated with the pluralities of FIFO memories, each set of data quantity detectors comprising first and second data quantity detectors which detect the quantity of data remaining in the respective FIFO memory at corresponding, first and second different detection points correlated to the first and second different types of graphic data and representing corresponding first and second amounts of free memory space for receiving and storing therein the corresponding, first and second types and amounts of graphic data and producing corresponding first and second detector outputs; and control means, responsive to the type of graphic data to be transferred to the FIFO memories, for selecting the corresponding one of the first and second data quantity detectors, selecting each FIFO memory having sufficient space to receive data of the type to be transferred according to the detector output of the selected quantity detector, and writing the graphic data into each corresponding FIFO memory.

2. The apparatus according to claim 1, wherein the first and second types of graphic data comprise coordinate data and attribute data, respectively.

3. The apparatus according to claim 1, wherein the first and second data quantity detectors detect coordinate data and attribute data, respectively.

4. The apparatus according to claim 3, wherein the second detection point is located such that the number of registers, counted from a data full point in each of the FIFO memories, is sufficient to store the maximum transferable length of attribute data.

5. The apparatus according to claim 4, wherein the first detection point of each FIFO memory is located in the middle, between a data empty point and the second detection point, in the FIFO memory.

6. The apparatus according to claim 5, wherein the maximum length of a transferrable block of coordinate data is within a range between the data empty point and the first detection point of each FIFO memory.

7. The apparatus according to claim 3, wherein, in response to a determination by the control means that the graphic data to be transferred are coordinate data, the control means selects the first flags provided by the first data quantity detectors and in response to each first flag in a reset state, selects the corresponding FIFO memory and writes the distributed coordinate data being transferred into the selected FIFO memory and, in response to a determination by the control means that the graphic data are attribute data, the control means selects the second flags provided by the second data quantity detectors and, in response to all of the second flags being in a reset state and thereby indicating that all of the FIFO memories have sufficient space to receive the corresponding, distributed attribute data, writes the corresponding, distributed attribute data into the plurality of FIFO memories.

8. The apparatus according to claim 1, wherein:

the FIFO memories comprise a plurality of registers; and the first and second detection points correspond respectively to first and second numbers of registers, counted from a data empty point, in each of the FIFO memories.

9. The apparatus according to claim 8, wherein the first and second data quantity detectors produce set or reset states of corresponding first and second flags according to the existence or absence, respectively, of data at the respective first and second data quantity detection points in the corresponding FIFO memory.

10. The apparatus according to claim 9, wherein the control means is responsive to the reset states of the first and second flags for transferring the first and second data, respectively, to the corresponding FIFO memory.

* * * * *

UNITED STATES PATENT AND TRADEMARK OFFICE
CERTIFICATE OF CORRECTION

PATENT NO. : 5,500,939
DATED : March 19, 1996
INVENTOR(S) : KURIHARA

It is certified that error appears in the above-indentified patent and that said Letters Patent is hereby corrected as shown below:

Col. 5, line 13, change "5a<" to --5a <--.

Signed and Sealed this

Sixth Day of August, 1996

Attest:

BRUCE LEHMAN

Attesting Officer  Commissioner of Patents and Trademarks